(12) United States Patent
Fakhri

(10) Patent No.: US 7,208,079 B2
(45) Date of Patent: Apr. 24, 2007

(54) PROCESS FOR THE TREATMENT OF WASTE OILS

(75) Inventor: Nouredine Fakhri, 7615 Louis Quilico, St-Léonard, Québec (CA) H4S 3E4

(73) Assignee: Nouredine Fakhri, St-Léonard (CA)

( * ) Notice: Subject to any disclaimer, the term of this patent is extended or adjusted under 35 U.S.C. 154(b) by 630 days.

(21) Appl. No.: 10/376,507

(22) Filed: Mar. 3, 2003

(65) Prior Publication Data
US 2004/0173505 A1 Sep. 9, 2004

(30) Foreign Application Priority Data
Jul. 30, 2002 (CA) .................................. 2396206

(51) Int. Cl.
*C10M 175/00* (2006.01)
*C10G 33/00* (2006.01)
(52) U.S. Cl. .................. 208/184; 208/179; 208/180; 208/181; 208/182; 208/183; 208/185; 208/186; 208/187; 202/160; 210/321.75
(58) Field of Classification Search ................ 202/160; 208/179, 180, 181, 182, 183, 184, 185, 186, 208/187; 210/321.75
See application file for complete search history.

(56) References Cited
U.S. PATENT DOCUMENTS
3,173,859 A 3/1965 Chambers .................. 208/184
(Continued)

FOREIGN PATENT DOCUMENTS
CA 1168590 6/1984
CA 2100302 1/1995
MA 23978 7/1997
WO WO 95/08609 * 3/1995

*Primary Examiner*—Glenn Caldarola
*Assistant Examiner*—Prem C. Singh
(74) *Attorney, Agent, or Firm*—Goudreau Gage Dubuc

(57) ABSTRACT

A process for the treatment of waste oil comprises the steps of (a) supplying a stream of the waste oil to a dehydrator to dehydrate the waste oil and obtain a stream of dehydrated waste oil; (b) supplying the stream of dehydrated waste oil to a fractionated distillation column having a lower tray, an upper tray and a middle tray therebetween, wherein the lower tray is operated at a temperature of 370 to 390° C. under a sub-atmospheric pressure of 50 to 100 mmHg, the middle tray is operated at a temperature of 265 to 280° C. under a sub-atmospheric pressure of 35 to 45 mmHg and the upper tray is operated at a temperature of 100 to 110° C. under a sub-atmospheric pressure of 30 to 40 mmHg; (c) withdrawing from the distillation column a bottom product comprising a bituminous material; (d) withdrawing a first side stream from the distillation column between the first and second trays, the first side stream comprising a heavy oil having a viscosity of 130 to 180 cSt at 40° C.; (e) withdrawing a second side stream from the distillation column between the second and third trays, the second side stream comprising a light base oil having a viscosity of 38 to 43 cSt at 40° C.; (f) withdrawing a third side stream from the distillation column above the third tray, the third side stream comprising diesel having a viscosity of 4 to 7 cSt at 40° C.; (g) withdrawing from the distillation column an overhead product comprising naphtha; and (h) recovering the bituminous material, heavy oil, light base oil, diesel and naphtha. The process according to the invention enables one to produce refined oil which is substantially free of heavy metal contaminants.

20 Claims, 4 Drawing Sheets

U.S. PATENT DOCUMENTS

| | | | |
|---|---|---|---|
| 3,923,644 A | 12/1975 | Hindman | 208/186 |
| 3,990,963 A | 11/1976 | Audibert et al. | 208/179 |
| 4,071,438 A | 1/1978 | O'Blasny | 208/180 |
| 4,255,252 A | 3/1981 | Knorre et al. | 208/182 |
| 4,342,645 A | 8/1982 | Fletcher et al. | 208/184 |
| 4,406,743 A | 9/1983 | MacQueen et al. | 196/46 |
| 4,512,878 A | 4/1985 | Reid et al. | 208/179 |
| 4,941,967 A | 7/1990 | Mannetje et al. | 208/184 |
| 5,186,833 A * | 2/1993 | Mchenry et al. | 210/321.75 |
| 5,209,838 A | 5/1993 | Sleppy et al. | 208/179 |
| 5,447,628 A | 9/1995 | Harrison et al. | 208/179 |
| 5,514,272 A | 5/1996 | Santos | 208/179 |
| 5,759,385 A | 6/1998 | Aussillous et al. | 208/187 |
| 5,871,618 A | 2/1999 | Lee et al. | 196/46.1 |
| 5,904,836 A | 5/1999 | Lee et al. | 208/97 |
| 6,024,880 A | 2/2000 | Ciora, Jr. et al. | 210/653 |
| 6,117,327 A | 9/2000 | Ciora, Jr. et al. | 210/637 |
| 6,132,596 A | 10/2000 | Yu | 208/179 |
| 6,224,716 B1 * | 5/2001 | Yoder | 202/160 |
| 6,712,954 B1 * | 3/2004 | Pohler et al. | 208/184 |

* cited by examiner

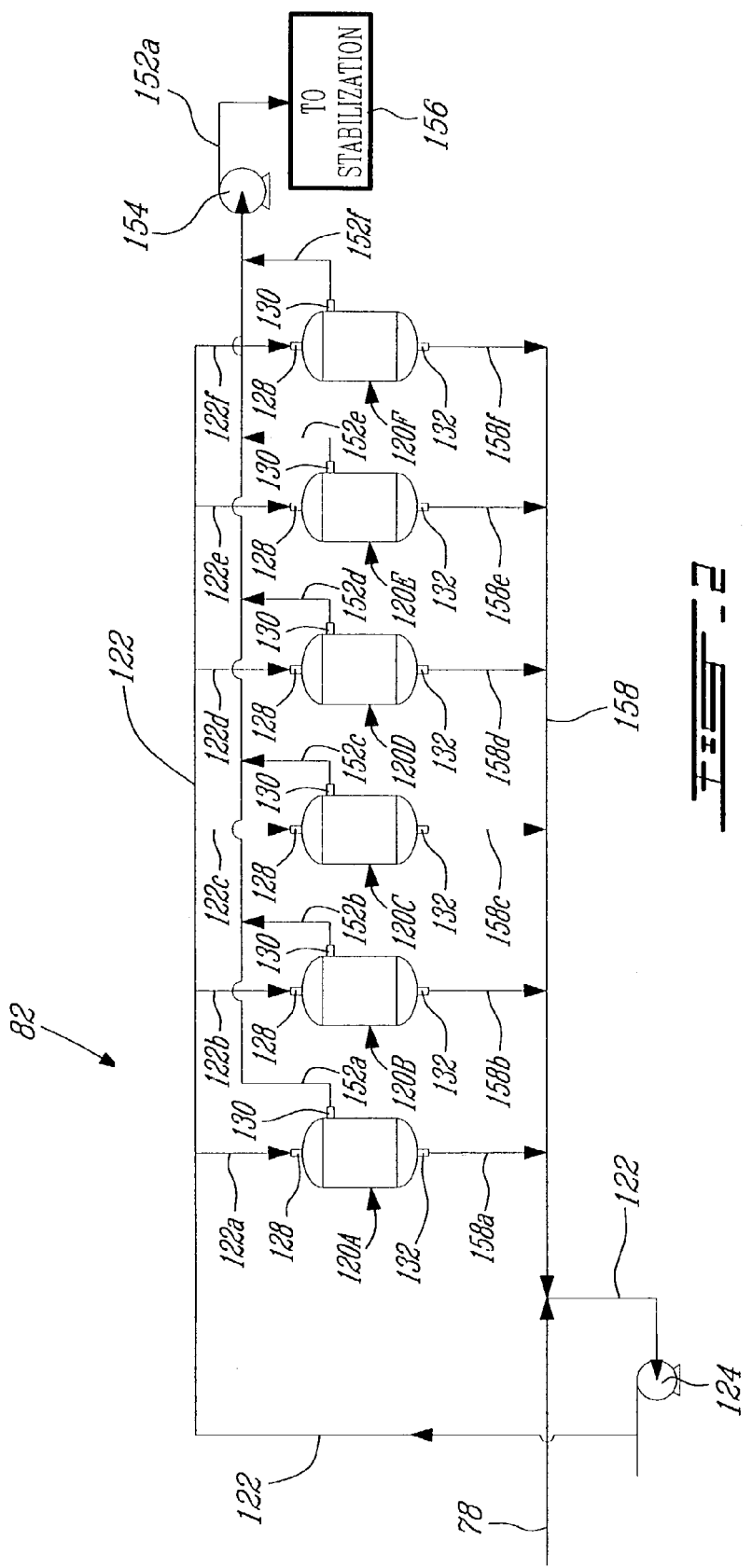

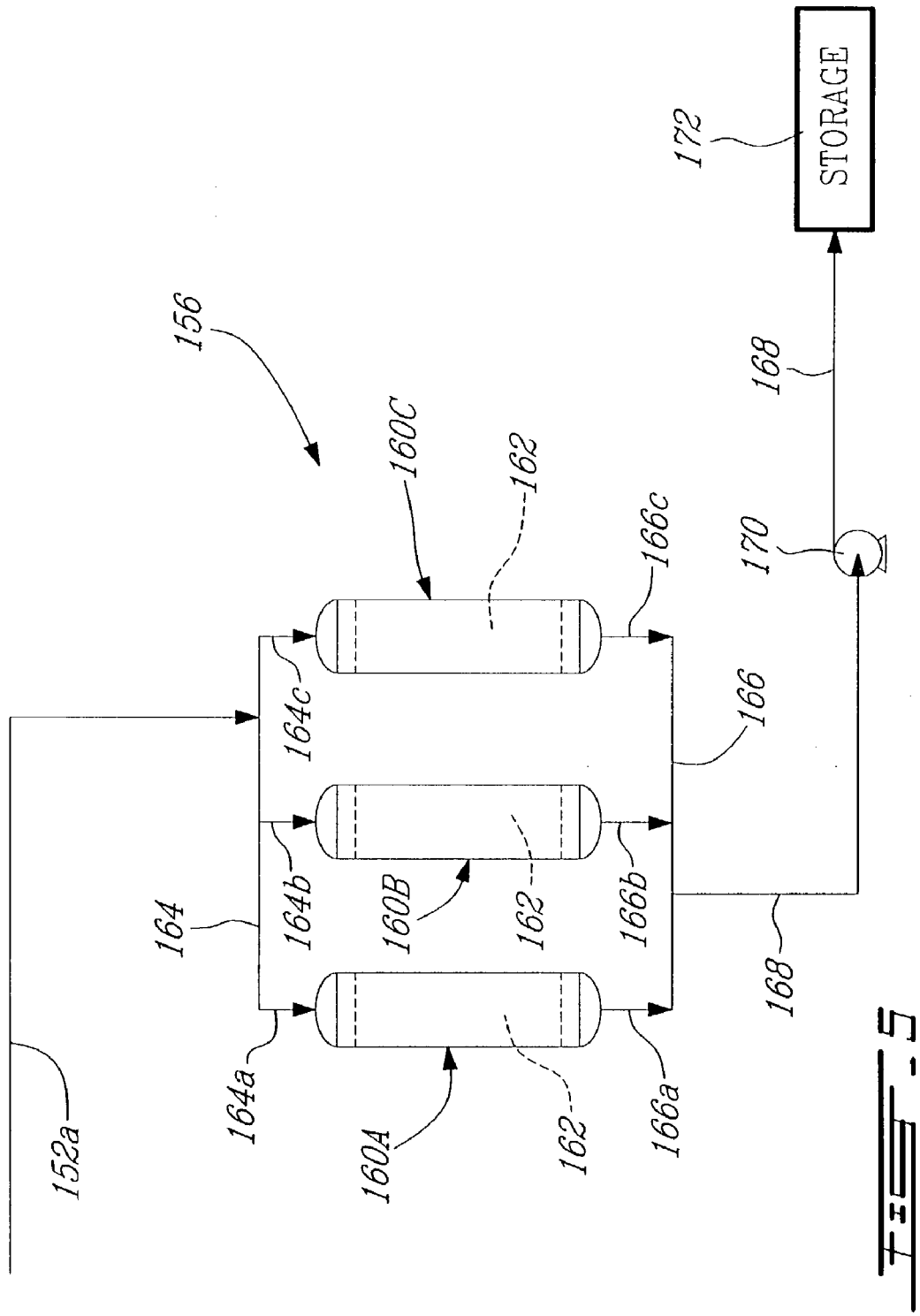

PROCESS FOR THE TREATMENT OF WASTE OILS

BACKGROUND OF THE INVENTION

The present invention pertains to improvements in the field of waste oil treatment. More particularly, the invention is directed to an improved process for the treatment of waste oils to produce refined oils which are substantially free of heavy metal contaminants.

Canadian Patent No. 1,168,590 discloses a process for the treatment of a hydrocarbon load by ultrafiltration at high temperature. Use is made of ceramic membranes having a porosity of 50 to 250 Å and the ultrafiltration is carried out at a temperature between 100 and 350° C. Such a high temperature reduces the life of the membranes. Moreover, the filtration flow is very weak and the quality of the products obtained is not according to standards.

U.S. Pat. No. 6,024,880 discloses a method for treating used oil to remove ash and color contaminants therefrom, wherein use is made of a porous ceramic membrane. The pores of the ceramic material are in the shape of a funnel, which renders the filtration difficult. In addition, such a type of ceramic membrane does not permit an effective separation of heavy metal contaminants from the oil.

SUMMARY OF THE INVENTION

It is therefore an object of the present invention to overcome the above drawbacks and to provide an improved process for the treatment of waste oils to produce refined oils which are substantially free of heavy metal contaminants.

In accordance with the invention, there is thus provided a process for the treatment of waste oil. The process of the invention comprises the steps of:
  a) supplying a stream of the waste oil to a dehydrator to dehydrate the waste oil and obtain a stream of dehydrated waste oil;
  b) supplying the stream of dehydrated waste oil to a fractionated distillation column having a lower tray, an upper tray and a middle tray therebetween, wherein the lower tray is operated at a temperature of 370 to 390° C. under a sub-atmospheric pressure of 50 to 100 mmHg, the middle tray is operated at a temperature of 265 to 280° C. under a sub-atmospheric pressure of 35 to 45 mmHg and the upper tray is operated at a temperature of 100 to 110° C. under a sub-atmospheric pressure of 30 to 40 mmHg;
  c) withdrawing from the distillation column a bottom product comprising a bituminous material;
  d) withdrawing a first side stream from the distillation column between the first and second trays, the first side stream comprising a heavy oil having a viscosity of 130 to 180 cSt at 40° C.;
  e) withdrawing a second side stream from the distillation column between the second and third trays, the second side stream comprising a light base oil having a viscosity of 38 to 43 cSt at 40° C.;
  f) withdrawing a third side stream from the distillation column above the third tray, the third side stream comprising diesel having a viscosity of 4 to 7 cSt at 40° C.;
  g) withdrawing from the distillation column an overhead product comprising naphtha; and
  h) recovering the bituminous material, heavy oil, light base oil, diesel and naphtha.

Applicant has found quite unexpectedly that by using a fractionated distillation column having the aforesaid lower tray which is operated at a temperature of 370 to 390° C. under a sub-atmospheric pressure of 50 to 100 mmHg, any heavy metal contaminants present in the waste oil fed to the column are substantially completely retained in the bottom product so that the heavy oil, the light base oil and the diesel obtained in steps (d), (e) and (f), respectively, are substantially free of such contaminants.

The heavy oil obtained in step (d) is an off-spec oil which can be used as a lubricating oil. The light base oil obtained in step (e), on the other hand, can be used for formulating motor oils.

According to a preferred embodiment of the invention, the first side stream is supplied to a microfiltration system to treat the heavy oil by microfiltration and obtain a stream of filtered heavy oil consisting of a heavy base oil having a viscosity of 140 to 160 cSt at 40° C. and a stream of non-filtered heavy oil. Preferably, the microfiltration system comprises a plurality of microfiltration units arranged in parallel relationship to one another. In a particularly preferred embodiment, the microfiltration units each comprise a housing having feed inlet means for receiving the first side stream, first outlet means for discharging the stream of filtered heavy oil and second outlet means for discharging the stream of non-filtered heavy oil. Each microfiltration unit further comprises a plurality of tubular members formed of a porous material having a porosity between 2,000 and 15,000 Å and arranged in spaced-apart parallel relationship inside the housing. The tubular members define therebetween a space in fluid flow communication with the first outlet means, each tubular member having an inlet in fluid flow communication with the feed inlet means and an outlet in fluid flow communication with the second outlet means. The porous material is preferably stainless steel.

According to another preferred embodiment, the first side stream flows through each tubular member at a speed of 1 to 5 m/s and is maintained at a temperature of 175 to 195° C. while flowing through each said tubular member. Preferably, each tubular member has an innerwall surface lined with a porous membrane formed of carbon black to further assist in removing traces of heavy metal contaminants.

According to further preferred embodiment, the stream of heavy base oil is fed through a fluidized bed containing a stabilizing agent to stabilize the heavy base oil and obtain a stabilized heavy base oil. The fluidized bed is preferably maintained at a temperature of 100 to 200° C. Examples of suitable stabilizing agents which can be used include activated alumina and activated silica gel. It is also possible to use a mixture of activated alumina and calcium carbonate or activated silica gel, such as a mixture comprising about 50 wt. % of activated alumina and about 50 wt. % of calcium carbonate or activated silica gel.

The use of the above stabilizing agent enables to stabilize the heavy base oil against light so that the oil will not change color when exposed to light. It also enables to remove undesirable odours from the oil and to improve its color.

BRIEF DESCRIPTION OF THE DRAWINGS

Further features and advantages of the invention will become more readily apparent from the following description of preferred embodiments as illustrated by way of examples in the accompanying drawings, in which:

FIG. 2 is schematic flow diagram illustrating how the heavy oil is treated by microfiltration according to another preferred embodiment of the invention;

FIG. 5 is a schematic flow diagram illustrating how the heavy base oil is stabilized according to a further preferred embodiment of the invention.

DETAILED DESCRIPTION OF PREFERRED EMBODIMENTS

Figure 1:
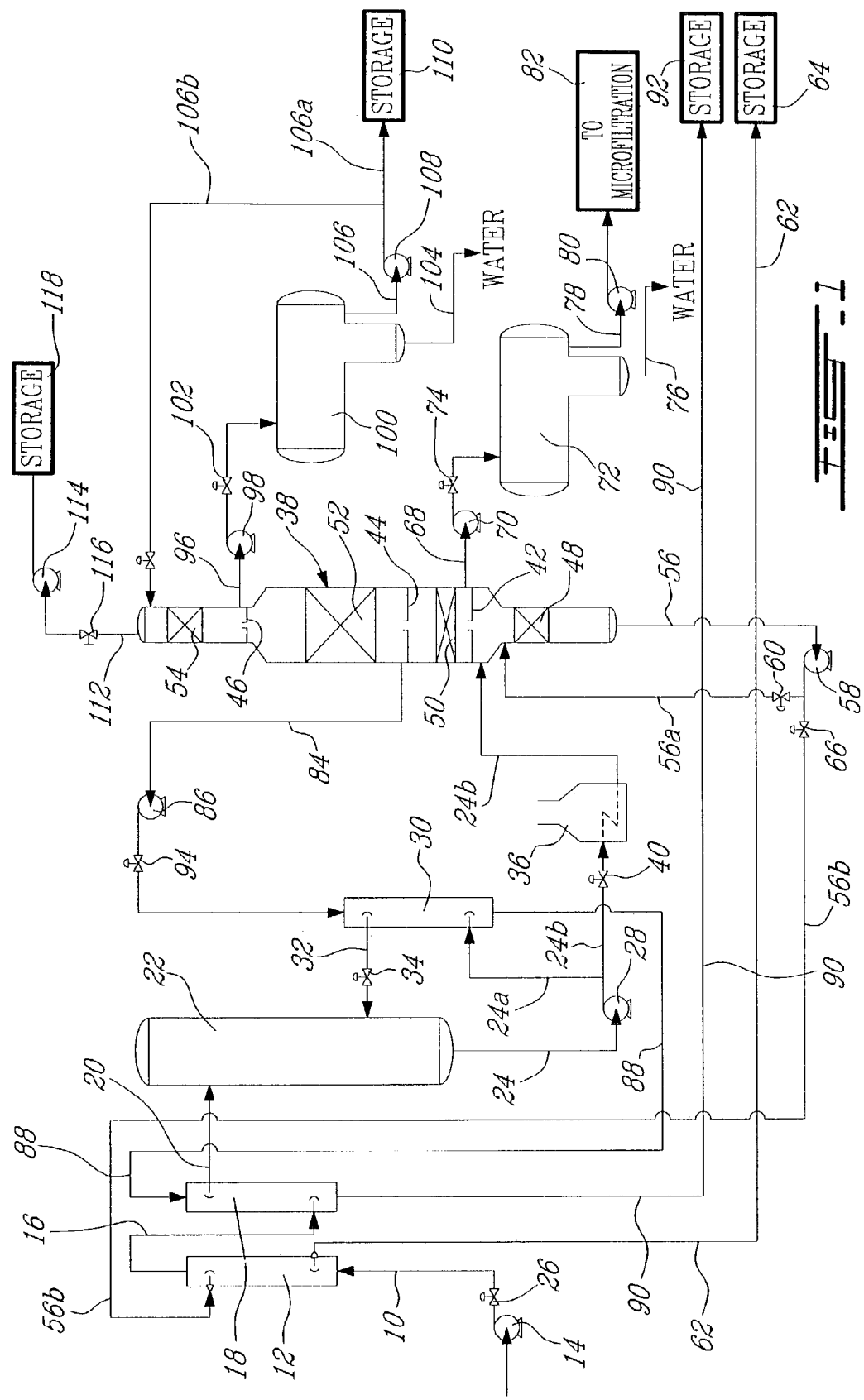
FIG. 1 is a schematic flow diagram illustrating a process for the treatment of waste oil, according to a preferred embodiment of the invention.

Referring first to FIG. 1, there is illustrated a process for the treatment of waste oil, wherein a stream of waste oil is supplied via line 10 to a first heat exchanger 12 by means of pump 14, for partially pre-heating the waste oil. The stream of partially pre-heated waste oil is supplied via line 16 to a second heat exchanger 18 for further pre-heating the waste oil. The stream of pre-heated waste oil is then supplied via line 20 to a dehydrator 22 for dehydrating the waste oil to obtain a dehydrated waste oil which is discharged through line 24. A valve 26 is used to control the flow rate of the waste oil through lines 10, 16 and 20. The stream of dehydrated waste oil is split into two streams, after having passed through pump 28. The first split stream is supplied via line 24a to a heat exchanger 30 for preheating a portion of the dehydrated waste oil, which is recycled via line 32 to the dehydrator 22. The flow rate of the recycled stream is controlled by valve 34. The second split stream is passed via line 24b through a heater 36 and thereafter fed to a fractionated distillation column 38. The flow rate of the dehydrated waste oil through line 24b is controlled by valve 40. The heater 36 is used to heat the dehydrated waste oil to a temperature of 370–390° C.

The fractionated distillation column 38 has a first tray 42 which is operated at a temperature of 370–390° C. under a sub-atmospheric pressure of 50–100 mmHg, a second tray 44 which is operated at a temperature of 265–280° C. under a sub-atmospheric pressure of 35–45 mmHg, and a third tray 46 which is operated at a temperature of 100–110° C. under a sub-atmospheric pressure of 30–40 mmHg. The trays 42, 44 and 46 are bubble-cap trays. The column 38 further contains packings 48, 50, 52 and 54, formed of stainless steel. A stream of bituminous material is withdrawn via live 56 from the bottom of the column 38, by pump 58. The stream of bituminous material is split into two streams, after having passed through the pump 58. The first split stream of bituminous material is recycled via line 56a to the column 38. The flow rate of bituminous material through line 56a is controlled by valve 60. The second split stream of bituminous material is supplied via line 56b to the heat exchanger 12 for partially pre-heating the waste oil supplied via line 10. The stream of bituminous material discharged via line 62 is then sent to a storage unit 64. The flow rate of bituminous material through lines 56b and 62 is controlled by valve 66.

A first side stream is withdrawn via line 68 from the column 38 by pump 70 and supplied to a liquid phase separator 72. The first side stream comprises a heavy oil having a viscosity of 130–180 cSt at 40° C. The flow rate of heavy oil through line 68 is controlled by valve 74. Any water present in the heavy oil is separated by the phase separator 72 and discharged via line 76. The heavy oil is withdrawn via line 78 from the phase separator 72 by pump 80 and supplied to a microfiltration system 82. A second side stream is withdrawn via line 84 fro the column 38 by pump 86 and supplied to the heat exchanger 30 for pre-heating the dehydrated waste oil supplied via line 24a, and thereafter supplied via line 88 to the heat exchanger 18 for pre-heating the waste oil supplied via line 16. The second side stream comprises a light base oil having a viscosity of 38–43 cSt at 40° C. The stream of light base oil discharged via line 90 from the heat exchanger 18 is sent to a storage unit 92. The flow rate of light base oil through lines 84, 88 and 90 is controlled by valve 94. A third side stream is withdrawn via line 96 from the column 38 by pump 98 and supplied to a liquid phase separator 100. The third side stream comprises diesel having a viscosity of 4 to 7 cSt at 40° C. The flow rate of diesel through line 96 is controlled by valve 102. Any water present in the diesel is separated by the phase separator 100 and discharged via line 104. The diesel is withdrawn via line 106 from the phase separator 100 by pump 108. The stream of diesel is split into two streams, after having passed through the pump 108. The first split stream of diesel is sent via line 106a to a storage unit 110. The second split stream of diesel is recycled via line 106b to the column 38 to stabilize the overhead product which is withdrawn via line 112 from the column by a vacuum pump 114 and comprises naphtha. The flow rate of naphtha through line 112 is controlled by valve 116. The naphtha is then sent to a storage unit 118.

Figure 4:
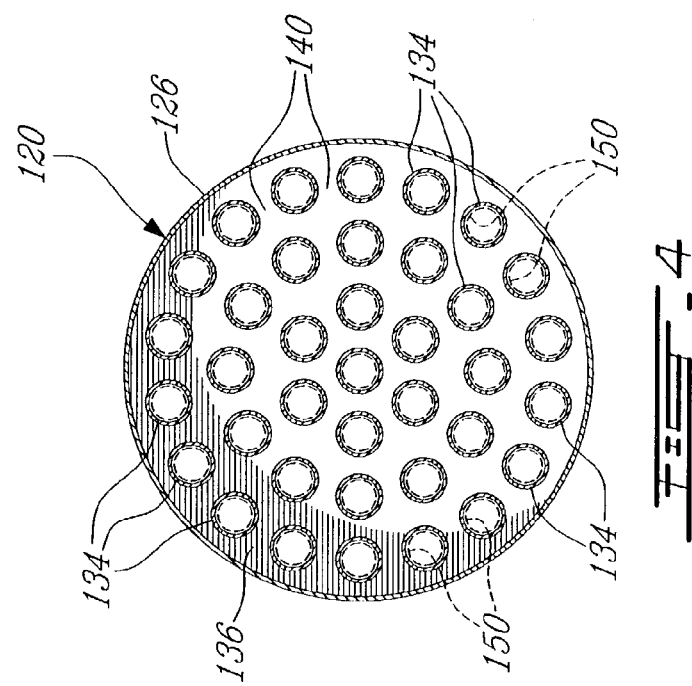
FIG. 4 is a sectional view taken along line 4—4 of FIG. 3.
Figure 3:
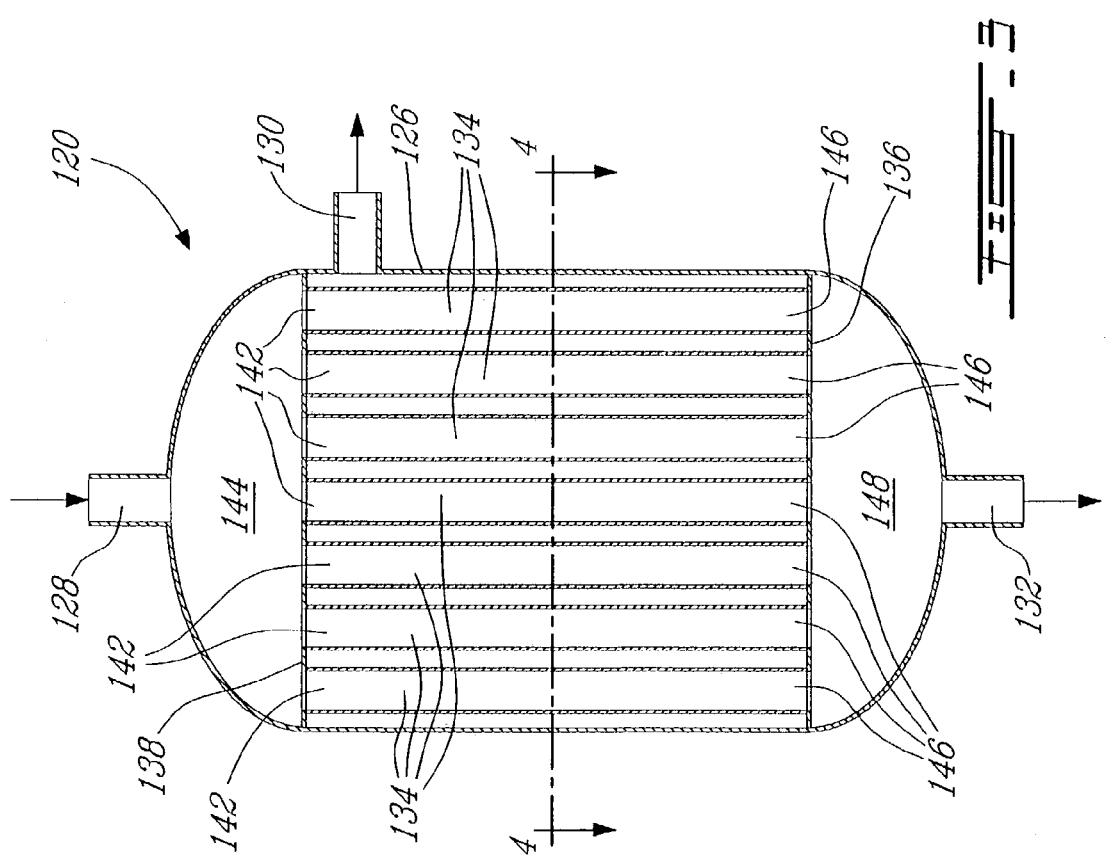
FIG. 3 is a sectional elevation view of one of the microfiltration units shown in FIG. 2.

The microfiltration system 82 which is used to treat the heavy oil discharged from the liquid phase separator 72 is illustrated in FIG. 2. As shown, the microfiltration system 82 comprises six microfiltration units 120A, 120B, 120C, 120D, 120E and 120F arranged in parallel relationship to one another. The stream of heavy oil is supplied via lines 78, 122, 122a, 122b, 122c, 122d, 122e and 122f, by pump 124, to the microfiltration units 120A, 120B, 120C, 120D, 120E and 120F. As shown in FIGS. 3 and 4, each microfiltration unit 120 comprises a housing 126 having an inlet 128 for receiving the heavy oil to be treated, a first outlet 130 for discharging a stream of filtered heavy oil and a second outlet 132 for discharging a stream of non-filtered heaving oil. Each unit 120 further comprises a plurality of tubular members 134 formed of porous stainless steel having a porosity between 2,000 and 15,000 Å and arranged in spaced-apart parallel relationship inside the housing 126. The tubular members 134 are supported by lower and upper apertured plates 136 and 138. The members 134 define therebetween a space 140 (shown in FIG. 4) in fluid flow communication with the outlet 130. Each tubular member 134 has an inlet 142 in fluid flow communication with an inlet chamber 144 which in turn is in fluid flow communication with the inlet 128 of the housing 126, and an outlet 146 in fluid flow communication with an inlet chamber 148 which in turn is in fluid flow communication with the outlet 132 of the housing. The inlets 142 and outlets 146 of the tubular members 134 register with the apertures formed in plates 136 and 138.

The heavy oil supplied to each microfiltration unit 120 flows through the inlet 128 and into the chamber 144, and enters each tubular member 134 through the inlet 142. A portion of the heavy oil passes through the pores defined in the walls of the members 134 and is thus filtered, the filtered heavy oil being discharged into the space 140. The filtered heavy oil consists of a heavy base oil having a viscosity of 140 to 160 cSt at 40° C., and is discharged from each unit 120 through the outlet 130. The innerwall surface of each tubular member 134 is lined with a porous membrane 150 formed of carbon black in order to assist in removing traces of heavy metals from the heavy oil. The remaining portion of heavy oil which is not filtered exits the tubular members 134 through the outlets 146, flows through the chamber 148 and is discharged from each unit 120 through the outlet 132.

As shown in FIG. 2, the streams of heavy base oil discharged from the microfiltration units 120A, 120B, 120C, 120D, 120E and 120F are supplied via lines 152a, 152b, 152c, 152d, 152e and 152f, by pump 154, to a stabilization system 156, lines 152b, 152c, 152d, 152e and 152f being in fluid flow communication with line 152a. The streams of non-filtered heaving oil discharged from the units 120A, 120B, 120C, 120D, 120E and 120F are recycled thereto via lines 158a, 158b, 158c, 158d, 158e, 158f, 158, 122, 122a, 122b, 122c, 122d, 122e and 122f, by pump 125, for re-processing.

The stabilization system 156 which is used to treat the heavy base oil discharged from the microfiltration system 82 is illustrated in FIG. 5. As shown, the stabilization system 156 comprises three stabilization units 160A, 160B and 160C arranged in parallel relationship to one another. Each stabilization unit contains a fluidized bed of stabilizing agent such as activated alumina or activated silica gel. The stream of heavy have oil is supplied via lines 152a, 164, 164a, 164b and 164c, by pump 154 (shown in FIG. 2), to the stabilization units 160A, 160B and 160C. The stabilized heavy base oil is withdrawn from the stabilization units 160A, 160B and 160C via lines 166a, 166b, 166c, 166 and 168, by pump 170, and sent to a storage unit 172. The stabilization system 156 enables to stabilize the heavy base oil against light so that the oil will not change color when exposed to light. It also enables to remove undesirable odors from the oil and to improves its color

I claim:

1. A process for the treatment of waste oil, comprising the steps of:
    a) supplying a stream of the waste oil to a dehydrator to dehydrate said waste oil and obtain a stream of dehydrated waste oil;
    b) supplying said stream of dehydrated waste oil to a fractionated distillation column having a lower tray, an upper tray and a middle tray therebetween, wherein said lower tray is operated a temperature of 370 to 390° C. under a sub-atmospheric pressure of 50 to 100 mmHg thereby substantially completely retaining in a bottom product any heavy metal contaminants comprised in the waste oil, said middle tray is operated at a temperature of 265 to 280° C. under a sub-atmospheric pressure of 35 to 45 mmHg and said upper tray is operated at a temperature of 100 to 110° C. under a sub-atmospheric pressure of 30 to 40 mmHg;
    c) withdrawing from said distillation column the bottom product comprising a bituminous material and, the heavy metal contaminants;
    d) withdrawing a first side stream from said distillation column between said first and second tray, said first side stream comprising a heavy oil having a viscosity of 130 to 180 cSt at 40° C.;
    e) withdrawing a second side stream from said distillation column between said second and third trays, said second side stream comprising a light base oil having a viscosity of 38 to 43 cSt at 40° C.;
    f) withdrawing a third side stream from said distillation column above said third tray, said third side stream comprising diesel having a viscosity of 4 to 7 cSt at 40° C.;
    g) withdrawing from said distillation column an overhead product comprising naphtha; and
    h) recovering said bituminous material, said heavy oil, said light base oil, said diesel and said naphtha.

2. A process as claimed in claim 1, wherein said first side stream is supplied to a liquid phase separator to separate any remaining water from said heavy oil.

3. A process as claimed in claim 1, wherein said first side stream is supplied to a microfiltration system to treat said heavy oil by microfiltration and obtain a stream of filtered heavy oil consisting of a heavy base oil having a viscosity of 140 to 160 cSt at 40° C. and a stream of non-filtered heavy oil.

4. A process as claimed in claim 3, wherein said microfiltration system comprises a plurality of microfiltration units arranged in parallel relationship to one another.

5. A process as claimed in claim 4, wherein said microfiltration units each comprise a housing having feed inlet means for receiving said first side stream, first outlet means for discharging said stream of filtered heavy oil and second outlet means for discharging said stream of non-filtered heavy oil; and a plurality of tubular members formed of a porous material having a porosity between 2,000 and 15,000 Å and arranged in spaced-apart parallel relationship inside said housing, said tubular members defining therebetween a space in fluid flow communication with said first outlet means, each said tubular member having an inlet in fluid flow communication with said feed inlet means and an outlet in fluid flow communication with said second outlet means.

6. A process as claimed in claim 5, wherein said porous material is stainless steel.

7. A process as claimed in claim 5, wherein said first side stream flows through each said tubular member at a speed of 1 to 5 m/s.

8. A process as claimed in claim 5, wherein said first side stream is maintained at a temperature of 175 to 195° C. while flowing through each said tubular member.

9. A process as claimed in claim 5, wherein each said tubular member has an innerwall surface lined with a porous membrane formed of carbon black.

10. A process as claimed in claim 5, wherein said second outlet means are in fluid flow communication with said feed inlet means for recycling said stream of non-filtered heavy oil to a respective one of said microfiltration units.

11. A process as claimed in claim 3, wherein said stream of heavy base oil is fed through a fluidized bed containing a stabilizing agent to stabilize said heavy base oil and obtain a stabilized heavy base oil.

12. A process as claimed in claim 11, wherein said fluidized bed is maintained at a temperature of 100 to 200° C.

13. A process as claimed in claim 11, wherein said stabilizing agent comprises activated alumina.

14. A process as claimed in claim 11, wherein said stabilizing agent comprises activated silica gel.

15. A process as claimed in claim 11, wherein said stabilizing agent comprises a mixture of activated alumina and calcium carbonate or activated silica gel.

16. A process as claimed in claim 15, wherein said mixture comprises about 50 wt. % of activated alumina and about 50 wt. % of calcium carbonate or activated silica gel.

17. A process as claimed in claim 1, wherein a portion of said bottom product is recycled to said distillation column.

18. A process as claimed in claim 17, wherein another portion of said bottom product is heat-exchanged with said stream of waste oil upstream of said dehydrator.

19. A process as claimed in claim 1, wherein said second side stream is heat-exchanged with a portion of the dehydrated waste oil to heat said portion of dehydrated waste oil, and wherein the heated portion of dehydrated waste oil is recycled to said dehydrator.

20. A process as claimed in claim 1, wherein said lower tray, said middle tray and said upper tray are bubble-cap trays.

* * * * *